Nov. 2, 1965 — E. J. GRABARSKI — 3,215,401
WHEELED HAND TRUCK WITH TRANSVERSE EXTENSION
MEANS AND CAM ELEVATING MEANS
Filed April 10, 1964 — 2 Sheets-Sheet 1
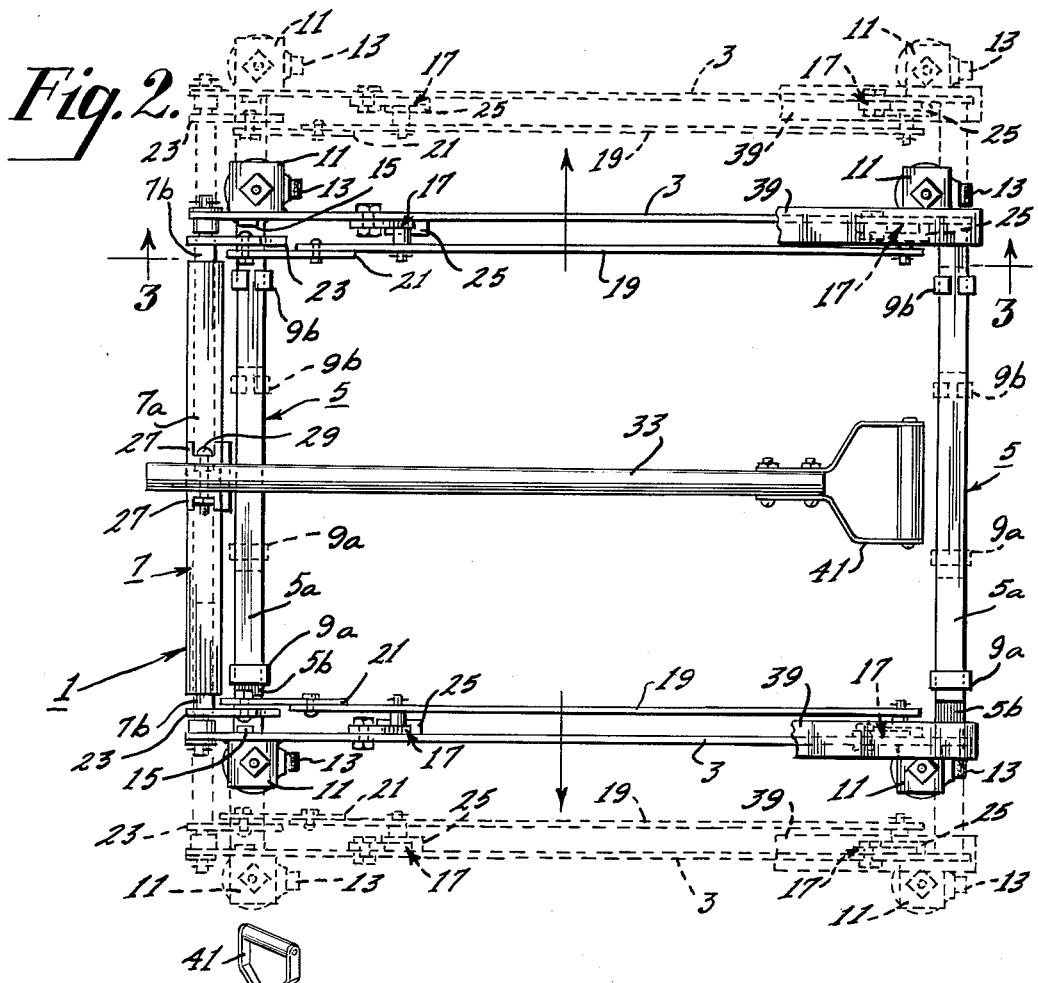
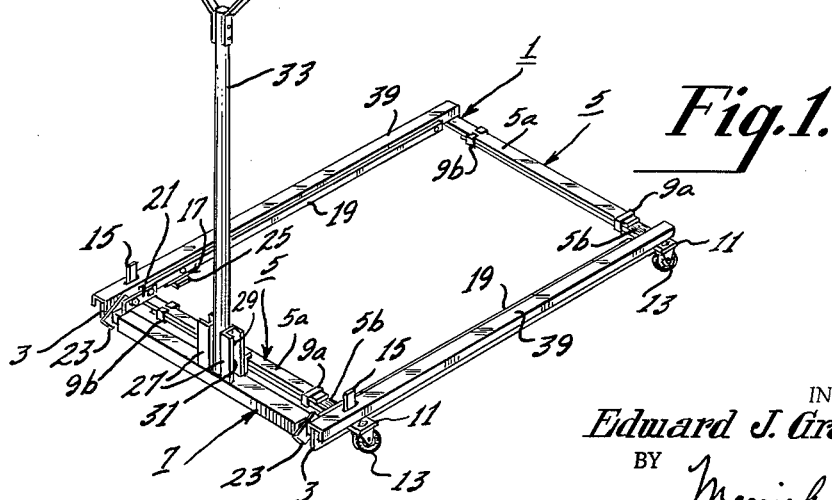
INVENTOR.
Edward J. Grabarski
BY
ATTORNEY.

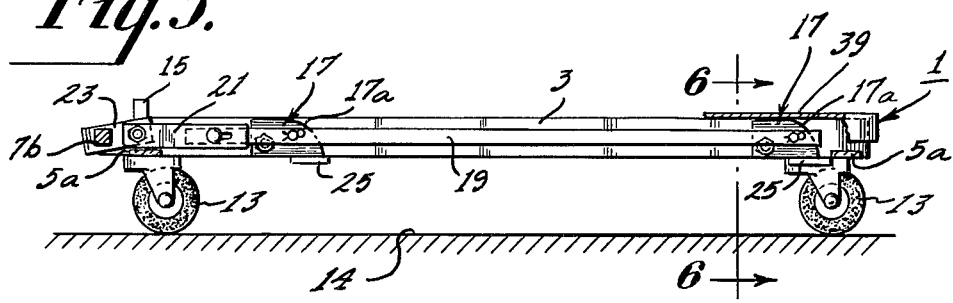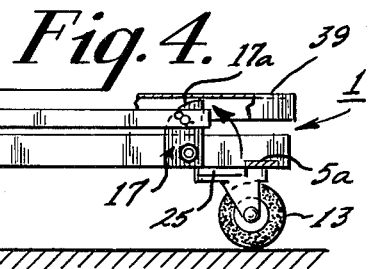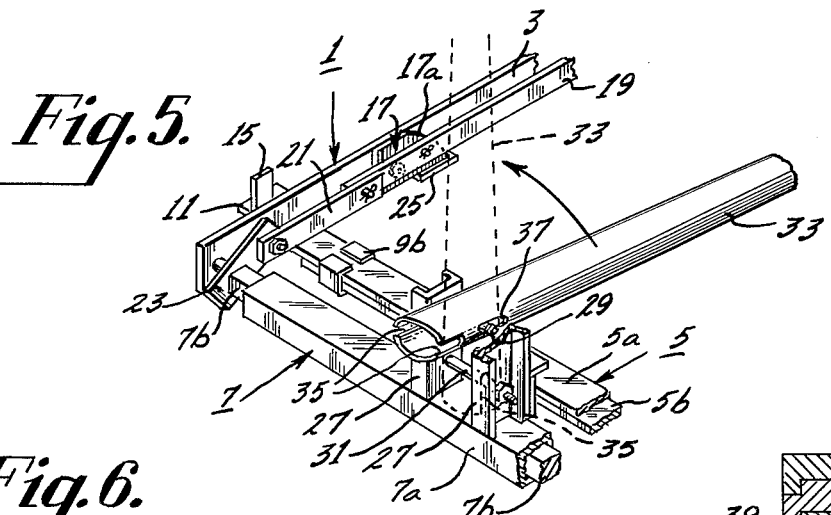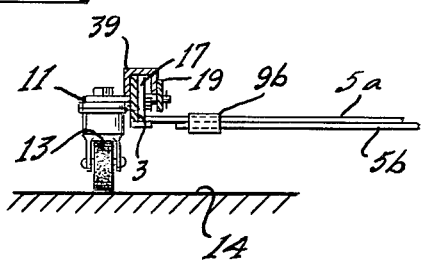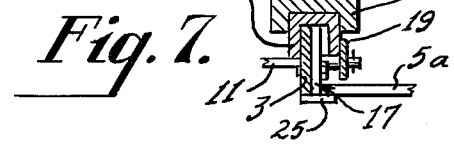
INVENTOR.
*Edward J. Grabarski*
BY
ATTORNEY.

ated Nov. 2, 1965

3,215,401
WHEELED HAND TRUCK WITH TRANSVERSE EXTENSION MEANS AND CAM ELEVATING MEANS

Edward J. Grabarski, 129 Baird Ave.,
Mount Ephraim, N.J.
Filed Apr. 10, 1964, Ser. No. 358,823
9 Claims. (Cl. 254—2)

This invention relates to devices for lifting and moving heavy articles, and more particularly to a wheeled hand truck or dolly which is especially useful in the home for easily raising various articles of furniture from the floor and moving them from one location to another.

In the course of performing household cleaning tasks, it is often desirable, if not even necessary, to move heavy articles of furniture such as bureaus, sofas, desks, etc., from their normal locations to some other location so that easy access can be had to the floor space they normally occupy or to the walls behind them. The same is true when floors are to be refinished or covered, as with linoleum, or when walls are to be painted or papered. In practically all such cases, the pieces of furniture to be moved are usually either pushed or dragged along the floor, or they must be lifted manually and carried from one place to another. Where the furniture is pushed along the floor, damage to the floor or to the covering thereon often results; and whether the furniture is pushed along the floor or is raised and carried, considerable expenditure of energy is involved.

Various forms of wheeled hand trucks or dollies have been provided heretofore for lifting and moving heavy loads. Most of these are designed for commercial use and are too heavy, bulky and expensive for home use. Moreover, known hand trucks are of fixed dimensions and cannot be adjusted for ready accommodation to loads of different widths. Thus, in using hand trucks of the prior art, care must be taken to center the truck properly with reference to the load, or the load, when lifted, is apt to tilt and slide to one side and back onto the floor in a tilted position. This may not only cause damage to the load and/or to the floor, but will make it difficult to remove the truck from the load so it can be replaced in proper position under the load.

Another problem connected with known commercial hand trucks is that they are invariably too high to be accommodated under most conventional furniture. There are many articles of furniture, such as sofas, arm chairs, davenports, bookcases, bureaus, etc., which conventionally have a clearance of as little as three inches from the floor. For such items of furniture, presently available hand trucks are entirely unsuitable because they are not shallow enough to permit wheeling them thereunder.

The primary object of the present invention is to provide an improved hand truck or dolly for lifting and moving heavy articles of furniture or the like and which is entirely free from the aforementioned and other disadvantages and limitations of prior art hand trucks.

More particularly, it is an object of this invention to provide an improved hand truck which is especially useful for lifting and moving heavy articles of furniture in the home, office, or the like, in a facile manner.

Another object of this invention is to provide an improved, wheeled hand truck which can be readily accommodated under most articles of furniture usually found in the home, and even where the clearance thereof relative to the floor is the minimum which is conventionally observed.

Still another object of this invention is to provide an improved, wheeled hand truck as aforementioned which is adjustable laterally to various widths so as to avoid raising articles of furniture under conditions where they are apt to slide sideways off the truck due to improper centering of the truck relative to the furniture to be lifted.

A further object of this invention is to provide an improved, wheeled hand truck as above set forth which can manipulated easily even by one without experience in handling such devices.

Yet another object of this invention is to provide an improved, wheeled hand truck as aforesaid which can be collapsed into a small unit for compact storage in a small space when not in use.

It is also an object of this invention to provide an improved, wheeled hand truck such as set forth which is simple in construction, easy to manufacture, inexpensive in cost, easy to operate, and highly efficient in use.

In accordance with this invention, one form of hand truck comprises a frame structure mounted on wheels or casters and having a pair of side rails and a pair of end rails connected to the side rails. The end rails are comprised of longitudinally adjustable parts so that the truck can be expanded or collapsed to various widths transversely or crosswise of the frame structure for accommodation to various loads as required. On each side rail are a plurality of pivotally mounted cam members which serve as elevators for inverted load engaging channel members mounted on the cam members. At one end of the truck, the side rails carry a rotatable cross-member which is also comprised of parts adjustable crosswise of the frame structure. This rotatable cross-member has pivotally mounted thereon an elongated pole which can be locked thereto for rotating the cross-member. The pole terminates in a handle to facilitate manipulating of the truck. The rotatable cross-member is connected by linkage to the several elevator cam members. When the pole, while locked to the rotatable cross-member, is swung up to an upright or substantially vertical position, it rotates the cross-member in a direction to cause the linkage to turn the cam members in a direction to permit the load engaging channel members to be lowered to a lowermost position quite close to the floor. The truck can then be wheeled readily under the article to be moved. The pole is then swung downwardly in a forward direction toward a horizontal position, thereby actuating the linkage to rotate the cam members in a direction to raise the channel members and cause them to engage the article to be moved and raise it slightly off the floor. The article of furniture or the like can then be wheeled easily to another location and the pole then raised to its vertical position. This causes the cam members to return to their original, starting position and permit the load carrying channel members to lower and recede from the load once the load has engaged the floor. The truck can then be wheeled out from under the load. When the truck is to be stored, the side rails are moved as close to each other as is permitted by the adjustable end rails and the rotatable cross-member, and the pole is swung in a backward direction over the frame structure to a horizontal position. The truck is thus collapsed into compact form for ready storage in a small space.

The novel features of the invention, both as to its organization and method of operation, as well as additional objects and advantages thereof, will be more readily apparent from the following description, when read in connection with the accompanying drawings, in which:

FIGURE 1 is a perspective view of one form of wheeled hand truck according to this invention, the truck being shown in readiness to be wheeled under a load;

FIGURE 2 is an enlarged, top plan view of the truck of FIGURE 1 with the pole and its handle lowered to the storage position, the frame structure being shown completely collapsed in solid lines, as when it is to be stored or when the truck is to be wheeled under a relatively narrow load, and partly expanded in dotted lines, as when it is to be wheeled under a relatively wider load;

FIGURE 3 is a sectional view taken along the line 3—3 of FIGURE 2 and partly broken away to shown certain details, the cam members and the channel members carried thereby being shown in the lowered position occupied by them when the truck is to be wheeled under a load;

FIGURE 4 is a view similar to FIGURE 3 but with the cams and the load supporting channel members in the raised position they occupy when supporting a load;

FIGURE 5 is a somewhat enlarged, fragmentary, perspective view of the front end of the frame structure showing certain details of construction;

FIGURE 6 is a sectional view taken along the line 6—6 of FIGURE 3; and

FIGURE 7 is a fragmentary, sectional view corresponding to FIGURE 6 showing a modified form of load supporting channel member by means of which the hand truck of this invention can be accommodated to loads having a relatively high clearance from the floor.

Referring more particularly to the drawings, there is shown a wheeled hand truck having a frame structure 1 comprised of a pair of opposed side rails 3, a pair of opposed end rails 5 which are longitudinally adjustable on each other in a manner and for a purpose presently to be described, and a similarly adjustable cross-member 7 rotatably mounted on the side rails 3 adjacent one of the end rails 5. The side rails 3 and the end rails 5 may be formed of rigid, steel bars. Each of the end rails 5 comprises an upper bar 5a welded to one of the side rails 3 and a lower bar 5b welded to the other side rail 3 adjacent the opposite ends of the side rails. Steel straps 9a are welded to the respective upper bars 5a and are wrapped somewhat loosely around the associated lower bars 5b. Similar steel straps 9b are welded to the lower bars 5b and are wrapped somewhat loosely around the associated upper bars 5a. Thus, the straps 9a and 9b provide loops within which the respective bars 5a and 5b can slide longitudinally along each other for transverse adjustment of the frame structure to various overall widths from the narrowest width, as represented by the solid lines of FIGURE 2, to greater widths, as represented by the dotted lines of the same figure. The truck can therefore be readily adjusted transversely to its fully collapsed, or most narrow, width for storage or for use under narrow loads, or to wider overall widths within the limits permitted by the straps 9a and 9b for proper accommodation to relatively wider loads.

The cross-member 7 comprises an intermediate, rigid, tubular member 7a, preferably square in cross-section, and end members 7b of like cross-section slidably received in the tubular member 7a at the opposite ends thereof for longitudinal, sliding adjustment of these members relative to each other upon transverse adjustment of the frame structure. The end members 7a are rotatably mounted in aligned openings adjacent one end of the respective side rails 3 so that the entire cross-member 7 can be rotated or rocked on the side rails for a purpose shortly to be set forth.

Secured to the side rails 3 near the four corners of the frame structure 1 are outwardly extending arms 11. Mounted on each arm 11 is a wheel device 13, such as a caster or the like, the wheel devices 13 supporting the frame structure for easy movement thereof over a floor or other support 14. Also secured to the side rails 3 and extending upwardly therefrom are stop bars 15 which serve a purpose also to be set forth presently.

Rotatably mounted on each of the side rails 3 in suitably spaced relation are two or more cam plates 17, each having a normally upwardly facing cam edge 17a. Two such cam plates are shown on each side rail merely by way of illustration. Elongated link bars 19 are pivotally connected to the respective sets of cam plates 17 eccentrically with respect to the axes of rotation of the various cam plates, as best seen in FIGURES 3, 4 and 5. Each of the link bars 19 has pivotally connected to it a link 21, the links 21 being, in turn, pivotally connected to crank arms 23 which are rigidly fixed to the respective end members 7b of the rotatable cross-member 7. Thus, as the cross-member 7 is rotated or rocked on the side rails 3, the crank arms 23 will move the linkage 21, 19 to cause the cam plates 17 to move from one to the other of (1) their lower position where they are disposed between the upper and lower edges of the side rails 3 and their cam edges 17a face generally upwardly, as in FIGURE 3, and (2) their raised position where their cam edges extend up beyond the upper edges of the side rails and their cam edges 17a face generally forwardly, or to the left, as seen in FIGURE 4. Stop members 25 may be secured to the lower edges of the side rails 3 for engagement by the cam plates 17 in their lower position.

Fixed to the intermediate, tubular members 7a of the cross-member 7 are a pair of spaced brackets 27 which carry upper and lower shafts 29 and 31, respectively. These shafts may be simply bolts extending through the brackets 27, 27 and held thereon by nuts. An elongated rod or pole 33, which may be either solid or tubular, and by means of which the truck may be manipulated manually, is formed with a longitudinally extending slot 35 at one end to provide a bifurcated end adapted to fit around the lower shaft 31 when the rod 33 is in a vertical position. The rod 33 is also formed in proximity to the bifurcated end thereof with a longitudinally elongated, transverse opening 37 therethrough. The upper shaft 29 extends through this opening 37. If the rod 33 is pulled straight upwardly or slid vertically from the position shown in FIGURE 1 until the lower end of the opening 37 engages the upper shaft 29, the rod is then free of the lower shaft 31 and can be swung backward (i.e., to the right as viewed in FIGURE 1) to a storage position over the frame structure, as in FIGURES 2 and 5. On the other hand, if the rod 33 is raised from its storage position about the shaft 29 as a pivot axis until it is in the vertical position and it is then slid straight downwardly, as permitted by the elongated opening 37, until its bifurcated end embraces the lower shaft 31, it becomes releasably locked to the cross-member 7 against individual pivotal movement relative to the cross-member. Thereafter, the rod can be swung forwardly downwardly or back to its vertical position only about the axis of the cross-member 7 as a pivot axis, thereby rocking or rotating the cross-member 7 with it. Rocking of the cross-member causes corresponding rocking of the crank arms 23 to actuate the links 21, 19 and thus the cam plates 17.

Straddling each of the side rails 3 and the cam plates 17 thereon is an inverted channel member 39 which is adapted to engage a load to be moved when the truck is wheeled thereunder. Normally (that is, when the cam plates 17 are in their lower position, as in FIGURES 1, 3 and 6), the channel members 39 rest on the upper edges of the side rails 3. When the rod 33 is swung forwardly and downwardly to rock the cross-member 7 counterclockwise (as viewed in FIGURES 1, 4 and 5), the cam plates 17 are also rotated counterclockwise to their elevated position. Their cam edges 17a thereupon engage the channel members 39 and elevate them from the position shown in FIGURE 3 to that shown in FIGURE 4. The channel members 39 thus engage the load and raise it slightly off the floor 14, whereupon the truck and load may be wheeled easily to another location. The load need be raised only enough to clear the floor. One-half inch to an inch provides ample clearance. To facilitate manipulating the truck, the rod or pole 33 may be provided with a handle 41. After the load has been moved to a desired location, the rod 33 is raised to its vertical position again to effect lowering of the cam plates 17 and their channel members 39 until the channel members are withdrawn from the load which is thus replaced or reset on the floor. The truck can then be wheeled out from under the load, folded into compact form, and stored in a convenient place.

In operating the truck, if the load is not fully raised from the floor at all points and an attempt is made to pull the truck prematurely, it could happen that, with the channel members 39 in engagement with the load, the truck might be pulled out from under the channel members. To prevent this, and also to prevent accidental or other unintentional displacement of the channel members from the side rails, the channel members are provided with slots through which the stop bars 15 are received. These stop bars therefore act to hold the channel members 39 in place at all times.

From the foregoing description, it will be apparent that there has been provided an improved, wheeled, hand truck which is especially useful in the home, in hotels, in clubs, in offices, etc., as well as in furniture stores, for easily lifting and moving furniture from one location to another. Such a hand truck can prove very useful to housewives in the course of performing cleaning chores or when rearranging furniture, as well as to floor finishers, painters, paperhangers, movers, and the like, who frequently have occasion to clear rooms completely of furniture and wish to do so in a minimum of time. In one form, this improved hand truck was made with a height of less than three inches when the cam plates were in their lowered position, so that the truck could readily be wheeled under practically all conventional pieces of furniture. The same truck had a length of about two feet, was collapsible to a width of about sixteen inches, and could be expanded transversely to a width of about twen-seven inches whereby it was readily accommodable to furniture pieces of varying sizes without need to exercise too great care to accurately center the truck under the load. In cases where the load clearance above the floor is greater than the highest level to which the cam plates 17 can lift the channel members 39, additional one or more channel members or blocks 43 of channel form can be stacked in inverted nested relation over the channel members 39, as shown in FIGURE 7, to bring the uppermost channel member to the desired height.

Although only one form of truck has been described herein, it will undoubtedly be apparent to those skilled in the art that other forms thereof, as well as variations in the form described herein, are possible within the spirit of this invention. It is desired, therefore, that the foregoing shall be taken as illustrative only, and not in a limiting sense.

What is claimed is:

1. In a hand truck adapted to be disposed under a floor supported load for raising the load off the floor at one location and moving it to another location thereon, the combination of a frame structure having a pair of opposed side rails and a pair of opposed end rails transverse to said side rails and connected thereto adjacent opposite ends thereof, said end rails each comprising a plurality of members longitudinally adjustable along each other for transverse adjustment of said frame structure to various widths, a plurality of wheel devices supporting said frame structure and movable along said floor, elevator means carried by said side rails for cooperation with a load to be moved, said elevator means having slots therein, means on said side rails extending through said slots for preventing accidental separation of said elevator means and said side rails, means coupled to said elevator means for actuating said elevator means to engage and disengage the load while said truck is disposed thereunder, and means for manipulating said truck over said floor, said manipulating means being coupled to said elevator actuating means for also operating said elevator actuating means.

2. In a hand truck adapted to be disposed under a floor supported load for raising the load off the floor at one location and moving it to another location thereon, the combination of a frame structure having a pair of opposed side rails and a pair of opposed end rails transverse to said side rails and connected thereto adjacent opposite ends thereof, said end rails each comprising a plurality of longitudinally adjustable members which are adjustable along each other for transverse adjustment of said frame structure to various widths, a plurality of wheel devices supporting said frame structure and movable along said floor, elevator means carried by said side rails for cooperation with a load to be moved, means coupled to said elevator means for actuating said elevator means to engage and disengage the load while said truck is disposed thereunder, said elevator actuating means comprising a cross-member on said frame structure adjacent to one of said end rails, said cross-member having an intermediate, tubular part and a pair of end parts telescopically slidable in said intermediate part, said end parts being respectively rotatably mounted on said side rails whereby said cross-member is rotatable as a whole on said side rails, said end parts being longitudinally slidable within said intermediate part upon transverse adjustment of said frame structure, and means for manipulating said truck over said floor, said manipulating means comprising an elongated rod pivotally carried by said cross-member intermediate part, said rod and said intermediate part having cooperative means for releasably locking said rod to said intermediate part so as to enable said rod to rotate said cross-member when said rod is swung about the axis of said cross-member to thereby also operate said elevator actuating means.

3. The invention set forth in claim 2 characterized by the addition on said cross-member intermediate part of bracket means and a pair of spaced shafts carried by said bracket means, and characterized further in that said rod has (1) a slot therein at one end whereby said rod is bifurcated at said end, and (2) a longitudinally elongated, transverse opening therethrough in proximity to said bifurcated end, one of said shafts extending through said opening whereby said rod is pivotal on said one shaft for swinging movement thereon to and from positions over said frame structure when said rod is free of the other of said shafts, and said rod being slidable in one direction on said one shaft to engage its said bifurcated end with said other shaft to thereby releasably lock said rod to said intermediate member whereby said rod can be swung about the axis of said cross-member and thus rotate said cross-member for actuating said elevator means, and said rod being slidable on said one shaft in the opposite direction to free said rod from said other shaft for swinging movement of said rod relative to said frame structure without rotating said cross-member.

4. A hand truck adapted to be disposed under a load for raising and moving the load, said truck comprising:
(a) a frame structure having a pair of side rails and a pair of end rails connected to said side rails, said end rails each comprising at least a pair of longitudinally adjustable members adjustable along each other for varying the overall transverse width of said frame structure,
(b) a plurality of wheel devices supporting said frame structure,
(c) cam means on said side rails movable from one to the other of lowering and elevating positions,
(d) load engaging means cooperatively associated with said cam means and movable by said cam means from a relatively low position when said cam means are in said lowering position, at which time said truck can be wheeled under the load, to a raised position when said cam means are in said elevating position whereby said load engaging means are brought into engagement with the load to raise said load free from its normal support and thus enable said truck and load to be wheeled to transfer the load to another location,
(e) said load engaging means having slots therein, (f) means on said side rails extending through said slots for preventing accidental separation of said load engaging means and said side rails, and (g) manually operable means carried by said frame structure coupled to said cam means for moving said cam means from one to the other of its said positions and vice versa.

5. A hand truck adapted to be disposed under a load for raising and moving the load, said truck comprising:

(a) a frame structure having a pair of side rails and a pair of end rails connected to said side rails, said end rails each comprising at least a pair of longitudinally adjustable members adjustable along each other for varying the overall transverse width of said frame structure, (b) a plurality of wheel devices supporting said frame structure, (c) a plurality of cam plates rotatably mounted on said side rails, said cam plates each having a cam edge and being rotatable to and from a first position wherein said cam edge is in a lowered position and a second position wherein said cam edge is in a raised position, (d) load engaging members comprising (1) first inverted channel members which straddle the respective said cam plates and are in engagement with their said cam edges, and (2) additional inverted channel members mounted on said first channel members in stacked relation therewith, said channel members all being movable by said cam edges from a relatively low position when said cam plates are in their said first position, at which time said truck can be wheeled under the load, to a raised position when said cam plates are in their said second position whereby said load engaging members are brought into engagement with the load to raise the load free from its normal support and thus enable said truck and load to be wheeled to transfer the load to another location, (e) means coupling said cam plates to each other for movement in unison from one to the other of their said first and second positions, and (f) manually operable means carried by said frame structure and coupled to said coupling means for actuating said cam plates through said coupling means.

6. A hand truck according to claim 4 characterized in that said load engaging members comprise inverted channel members which straddle the respective said cam means and which are in engagement with said cam means, said slots being formed in said channel members.

7. A hand truck according to claim 4 characterized by the addition of a longitudinally adjustable rotary cross-member on said frame structure adjacent to one of said end rails, characterized further by the addition of means coupling said cam means to each other and comprising linkage connecting said cross-member to each of said cam means, and characterized still further in that said manually operable means comprises an elongated rod connected to said cross-member and swingable vertically about the axis of said cross-member to thereby rock said cross-member and actuate said cam plates through said linkage.

8. In a hand truck adapted to be disposed under a load for raising and moving the load, the combination of:

(a) a frame structure having a pair of opposed side rails and a pair of opposed end rails connected to said side rails, (b) wheel devices supporting said frame structure, (c) load elevating means normally supported on said side rails for disposition under the load when said truck is wheeled thereunder, said load elevating means having slots therein, (d) means on said side rails extending through said slots for restraining said load elevating means against accidental separation from said side rails, (e) a plurality of cam members movably mounted on said side rails for cooperation with said load elevating means, said cam members having portions adapted to engage said load elevating means and raise said elevating means into engagement with said load when said cam members are moved in one direction and to effect lowering of said elevating means and said load when said cam members are moved in the opposite direction, and (f) manually operable means for moving said cam members in either of said directions.

9. In a hand truck adapted to be disposed under a load for raising and moving the load, the combination of:

(a) a frame structure having a pair of opposed side rails and a pair of opposed end rails connected to said side rails, (b) wheel devices supporting said frame structure, (c) load elevating members normally supported on said side rails for disposition under the load when said truck is wheeled thereunder, said load elevating members having slots therein, (d) means on said side rails extending through said slots for restraining said load elevating members against accidental separation from said side rails, (e) a plurality of cam plates rotably mounted on said side rails for cooperation with said load elevating members, said cam plates having cam edges adapted to engage said load elevating means and raise said members into engagement with said load to raise said load when said cam plates are rotated in one direction and to effect lowering of said members and said load when said cam plates are rotated in the opposite direction, and (f) manually operable means for rotating said cam plates in either of said directions at will.

References Cited by the Examiner
UNITED STATES PATENTS

| Re. 14,404 | 12/17 | Mason | 254—2 |
| 709,245 | 9/02 | Scott | 254—10 X |
| 1,056,729 | 3/13 | Aspy | 254—2 |
| 1,196,638 | 8/16 | Atherton | 254—2 |
| 2,763,491 | 9/56 | Thorwaldson | 280—35 |

WILLIAM FELDMAN, *Primary Examiner.*

MILTON S. MEHR, *Examiner.*